(12) United States Patent
Fauteux et al.

(10) Patent No.: US 6,258,486 B1
(45) Date of Patent: Jul. 10, 2001

(54) ELECTROCHEMICAL CELL HAVING A SURFACE MODIFIED ELECTRODE AND ASSOCIATED FABRICATION PROCESS

(75) Inventors: Denis G. Fauteux, Acton, MA (US); Wlodek T. Krawiec, Bryan, TX (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/353,979

(22) Filed: Jul. 15, 1999

(51) Int. Cl.$^7$ .............................. H01M 4/48; H01M 4/62
(52) U.S. Cl. .................... 429/232; 429/218.1; 429/231.1
(58) Field of Search .............................. 429/218.1, 231.1, 429/232

(56) References Cited

U.S. PATENT DOCUMENTS 4,465,747 * 8/1984 Evans .................................... 429/194
6,063,142 * 5/2000 Kawakami et al. ................. 29/623.5

OTHER PUBLICATIONS

A. Manthiram and J. Kim, "Low Temperature Synthesis of Insertion Oxides for Lithium Batteries" *Chem. Mater.* 1998, vol. 10, p. 2895–2909 no month.

R.W. Schwartz, D.A. Payne and A.J. Holland, "The Effects of Hydrolysis and Catalysis Conditions on the Surface Area and Decomposition Behavior of Polymeric Sol–Gel Derived PbTiO$_3$ Powders" *Ceram. Powder Process Sci., Proc. Int. Conf.* $2^{nd}$, 1989, p. 165–172 no month.

* cited by examiner

*Primary Examiner*—Carol Chaney
(74) *Attorney, Agent, or Firm*—Factor & Partners

(57) ABSTRACT

An electrode for use in an electrochemical cell comprising a current collecting substrate, an active material associated with the substrate; and a surface modifying component applied to at least a portion of the active material, wherein the surface modifying component is fabricated from at least one of the group consisting essentially of lithium niobates and lithium tantalates.

A process for manufacturing an electrochemical cell comprising the steps of associating a surface modifying component with an active material, modifying the surface of the active material, fabricating a first electrode by applying the surface modified active material to a current collecting substrate, fabricating a second electrode, and associating at least one electrolyte with the first and second electrodes.

13 Claims, 3 Drawing Sheets

** ELECTROCHEMICAL CELL HAVING A SURFACE MODIFIED ELECTRODE AND ASSOCIATED FABRICATION PROCESS

BACKGROUND OF THE INVENTION

1. Field of the invention

The present invention relates in general to electrochemical cells, and more particularly, to an electrochemical cell having an electrode with a modified surface layer. The present invention is further directed to a process for fabricating the same.

2. Background Art

Lithium based electrochemical cells have been known in the art for several years. Furthermore, experimentation associated with lithium based cells having intercalation type electrodes has been explored. While batteries utilizing intercalation type electrodes have exhibited some promising performance characteristics, compatibility between the active material layer of such electrodes and associated electrolyte remains largely problematic. For example, electrochemical cells based on lithiated transition metal oxide electrodes de-intercalate lithium ions at relatively high potentials in order to utilize their full capacity—above approximately 4 volts. This high charge voltage coupled with the naturally oxidizing character of the active material facilitates decomposition of the associated electrolyte. Such decomposition of the electrolyte, among other things, adversely affects coulombic efficiency, decreases net capacity as well as increases self-discharge rates of the cell.

It is therefore as object of the present invention to provide an electrode structure and associated fabrication process that remedies, among other things, the aforementioned detriments and/or complications associated with intercalation type electrodes.

SUMMARY OF THE INVENTION

The present invention is directed to an electrode for use in an electrochemical cell comprising: a) a current collecting substrate; b) an active material associated with the substrate; and c) a surface modifying component applied to at least a portion of the active material, wherein the surface modifying component is fabricated from at least one of the group consisting essentially of lithium niobates and lithium tantalates.

In a preferred embodiment of the invention, the electrode further comprises means for increasing the compatibility of the electrode with an associated electrolyte. In this embodiment the compatibility increasing means comprises the surface-modifying component.

In another preferred embodiment of the invention, the surface modifying component is fabricated from a lithium niobate species or lithium tantalate species having the chemical structure $Li_xNbO_y$ or $Li_xTaO_y$, wherein x and y range from about 1 to 5.

In yet another preferred embodiment of the invention, the surface-modifying component is in a crystalline or glassy state.

Preferably the surface modifying component is doped with at least one carbonaceous particle and/or at least one additive selected from the group consisting essentially of transition metal oxides, metal oxides, non-metal oxides, rare earth metal oxides, and metal phosphates, sulfates, and sulfides.

The present invention is also directed to a process for manufacturing an electrochemical cell comprising the steps of: a) associating a surface modifying component with an active material; b) modifying the surface of the active material c) fabricating a first electrode by applying the surface modified active material to a current collecting substrate; d) fabricating a second electrode; and e) associating at least one electrolyte with the first and second electrodes.

In a preferred embodiment of the invention, the step of associating the surface modifying component includes the steps of: a) dissolving at least one of a lithium niobate species and a lithium tantalate species in a solvent and, in turn, preparing a solution; b) applying the prepared solution to the active material; and c) substantially removing the solvent from the solution.

In another preferred embodiment of the invention the step of preparing the solution includes the step of doping the solution with at least one carbonaceous species and/or the step of doping the solution with at least one of the group of transition metal oxides, non-metal oxides, rare earth metal oxides, and metal phosphates, sulfates, and sulfides.

BRIEF DESCRIPTION OF THE DRAWINGS

The invention will now be described with reference to the drawings wherein.

DETAILED DESCRIPTION OF THE DRAWINGS

Figure 1:
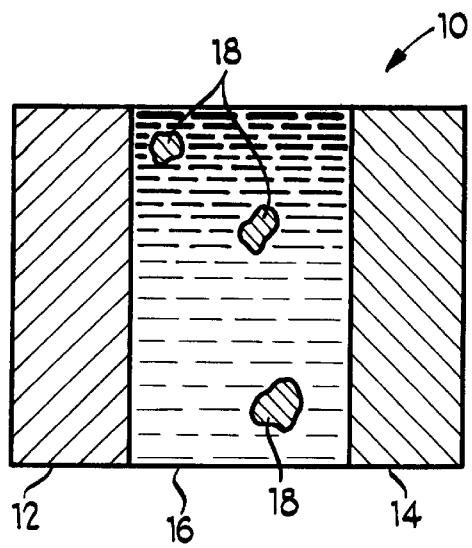
FIG. 1 of the drawings is a schematic representation of a prior art electrochemical cell before an initial charge.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Prior art electrochemical cell 10 is shown in FIG. 1, prior to an application of an initial electrical charge, as generally comprising first electrode 12, second electrode 14, and electrolyte 16. First electrode 12 is conventionally fabricated from lithium, carbon, or a mixture thereof and second electrode 14 is conventionally fabricated from a lithium transition metal oxide, such as $LiMn_2O_4$, $LiCoO_2$, or $LiNiO_2$. Electrolyte 16 can include an organic solvent 18 such as propylene carbonate (PC) or ethylene carbonate (EC).

Figure 2:
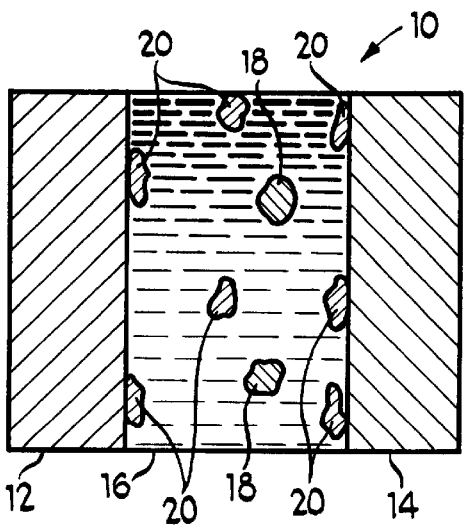
FIG. 2 of the drawings is a schematic representation of a prior art electrochemical cell after an initial charge.

Prior art electrochemical cell 10 is shown in FIG. 2, after a charge/discharge cycle, as generally comprising first electrode 12, second electrode 14, electrolyte 16, and decomposition products 20. As will be discussed in greater detail below, generation of decomposition products 20 can result in an electrochemical cell exhibiting poor coulombic efficiency, diminished capacity, and increased self-discharge rates as well as shortened cell life. Additionally, the solvent within electrolyte 16 can chemically interact with the electrode surface and subsequently form a gas species upon decomposition, which can render the cell not only inoperative, but also dangerous during its operation.

Figure 3:
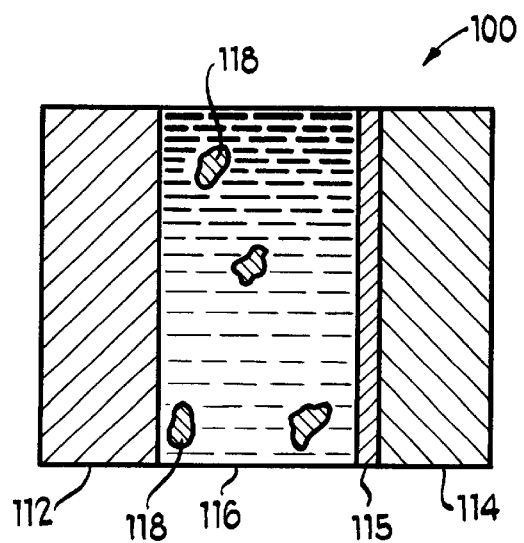
FIG. 3 of the drawings is a schematic representation of an electrochemical cell in accordance with the present invention.

Electrochemical cell 100 of the present invention is shown in FIG. 3 prior to an application of an initial electrical charge, as generally comprising first electrode 112, second electrode 114, electrolyte 116, and surface modifying component 115.

First electrode 112 is preferably fabricated from lithium, carbon, or a mixture of lithium and carbon and second electrode 114 is preferably fabricated from a lithium transition metal oxide, such as $LiMn_2O_4$, $LiCoO_2$, or $LiNiO_2$. Of course, any one of a number of conventional electrode materials is likewise contemplated for use.

For purposes of the present disclosure, electrolyte 116 includes a conventional salt, such as $LiPF_6$ or $LiAsF_6$, dissolved in a conventional solvent 118, such as propylene carbonate (PC) or ethylene carbonate (EC), although other commercially available and conventionally used solvents and salts or electrochemical systems (such as liquid, polymer, gel, and plastic systems) as would be readily understood to those having ordinary skill in the art having the present disclosure before them, are likewise contemplated for use.

Surface modifying component 115 is associated with second electrode 114. Surface modifying component 115 is preferably fabricated from lithium niobates and/or lithium tantalates such as $LiMO_2$, $LiMO_3$, $Li_5MO_5$, where M is Nb and/or Ta. Other suitable niobates and tantalates include those represented by the chemical formula $Li_{1-5}NbO_{1-5}$ and $Li_{1-5}TaO_{1-5}$. While specific niobates and tantalates have been disclosed, for illustrative purposes only, it will be understood that other species and/or derivatives that would be known to those will ordinary skill in the art having the present disclosure before them are likewise contemplated for use. Preferably surface modifying component 115 is fabricated into or exists in a crystalline or "glassy" state. Although not shown, it is further contemplated that surface modifying component 115 can be "doped" or associated with one or more carbonaceous particles, such as carbon black or graphite. In addition, the surface modifying component can also be "doped" or associated with other components, such as transition metal oxides, metal oxides including Fe and Cr, non-metal oxides, rare earth metal oxides, and metal phosphates, sulfates, and sulfides. As will be discussed in greater detail below surface modifying component 115 substantially increases the compatibility of electrode 114 with electrolyte 116. As will be discussed in greater detail below electrochemical cell 100 will not readily generate a substantial quantity of a decomposition product after an initial charge/discharge cycle as does cell 10 of the prior art.

The present invention is further directed to a process for fabricating electrochemical cell 100 comprising the following steps: First, surface modifying component 115 is associated with an active material, such as $LiNiO_2$, $LiCoO_2$, or $LiNiO_2$. Surface modifying component 115 is preferably associated with the active material by dissolving one or more lithium niobate or lithium tantalate species in a conventional solvent and then applying the prepared solution to at least a portion of the active material. The solvent can then be substantially removed by evaporation, to, in turn, result in a surface modified active material. Of course removal of the solvent can be hastened with the use of heat and/or a reduced pressure environment.

Next, electrode 114 is fabricated by applying the active material associated with surface modifying component 115 to a current collecting substrate, such as aluminum (not shown). After electrode 114 is fabricated, electrode 112 is fabricated. For purposes of the present disclosure, electrode 112 will be an anode and 114 will comprise a cathode. Of course, in a secondary cell configuration, the anode and cathode will become interchangeable with each other, depending on whether the cell is in a state of charging or discharging. Electrodes 112 and 114 are fabricated using conventional techniques.

Next, electrolyte 116 is associated with electrodes 112 and 114, respectively. Electrolyte 116 may comprise a salt, such as $LiPF_6$ or $LiAsF_6$, dissolved in at least one solvent, such as PC or EC. The electrolyte is fabricated using conventional techniques.

In an alternative embodiment of the process, the solution can be doped with a carbonaceous species and/or other additives such as transition metal oxides, metal oxides, non-metal oxides, rare earth metal oxides, and metal phosphates, sulfates, and sulfides.

In support of the present invention, the following experimental procedure was conducted:

Synthesis of $LiNiO_2$ Niobate Functional Gradient Material (FGM)

First, 6.00 grams of $LiNiO_2$ powder (Lectro™ Plus 200 cathode material, FMC Corp., Gastonia, N.C.) was placed in a dry, clean 6 fluid ounce jar. Second, approximately 13 milliliters of clean steel balls was added to the jar as a grinding medium. Third, 20 millimoles of LiNb$(OCH_2CH_3)_6$ (Gelest, Inc., Tulleytown, Pa.) was measured into a 100 milliliter beaker as a 25.0 gram solution in anhydrous alcohol. A magnetic stirring bar was then placed in the beaker, and the beaker was placed on a conventional stirring plate. Fourth, 30 milliliters of $H_2O$ was mixed with 20 milliliters of dry 2-methoxyethanol (Aldrich Chemical Co., Milwaukee, Wis.), which was then added to the 100 milliliter beaker. Fifth, 20 milliliters of anhydrous 2-methoxyethanol was added to the 6 fluid ounce jar. Sixth, the contents in the beaker were vigorously agitated for approximately 10 minutes. Seventh, the contents in the 100 milliliter beaker was charged into the 6 fluid ounce jar containing the $LiNiO_2$ powder. Eight, the jar was capped with a polytetrafluoroethylene (PTFE) lined cap and placed on a ball mill roller for approximately 48 hours. Next the contents in the jar were dried in an air oven having a temperature set point of approximately 100 degrees centigrade for approximately 48 hours. The contents were then dried for an additional 24 hours in a vacuum oven having a temperature set point of approximately 100 degrees centigrade. Next, the dried powder was transferred into an alumina tray for pyrolysis in an oxygen enriched atmosphere. The pyrolysis conditions were:

| Temperature Set Point In Degrees Centigrade | Duration at Set Point in Hours |
|---|---|
| 400 | 1.0 |
| 450 | 0.5 |
| 500 | 0.5 |
| 550 | 0.5 |
| 600 | 0.5 |
| 650 | 0.5 |
| 700 | 0.5 |
| 750 | 5.0 |

Finally, the $LiNiO_2$ niobate function gradient material was cooled down in the oven over 16 hours and then transferred to a clean dry jar for storage.

Test Electrode Preparation

First, 5.0661 grams of the above prepared $LiNiO_2$ niobate functional gradient material, 0.5970 grams of acetylene black (C-100, Cheveron Oil Co., Richmond, Calif.) and 0.2979 grams of polyvinylidene fluoride powder (534,000 molecular weight, Aldrich Chemical Co.) where charged into a dry, clean 6 fluid ounce jar. Ceramic grinding balls were added to the jar until the jar was half full. Next, enough hexane was charged into the jar so that the ceramic grinding balls were then covered with solvent. The jar was then capped with a PTFE lined cap and placed on a ball mill roller for approximately 24 hours. After milling, 3.0 milliliters of N,N-dimethyl formamide (Aldrich Chemical Co.) was added to the solvent paste. The resulting paste was then coated onto primed aluminum foil using a 0.003 inch gap coating knife. The coated material was dried atmospherically and then further dried in a vacuum oven having a temperature set point of approximately 100 degrees centigrade. Next, test electrodes were punched from the coated foil using a 9 millimeter die. Coin cells were then assembled using lithium metal as the counter electrode and a 1 Molar solution of $LiAsF_6$ in propylene carbonate (PC) as the electrolyte.

Electrochemical Testing

The above assembled cells were placed on a standard battery cycling test machine (Arbin BT-2043, Arbin Instruments, College Station, Tex.) and cycled at various rates of discharge and charge calculated from the estimated theoretical cell capacity of the cell's test electrode. The test results of the $LiNiO_2$ niobate FGM electrode coin cells can be seen in FIGS. 4 and 5. Comparative test results of coin cells fabricated from $LiNiO_2$ both with and without the niobate can be seen in FIGS. 6 and 7.

Figure 4:
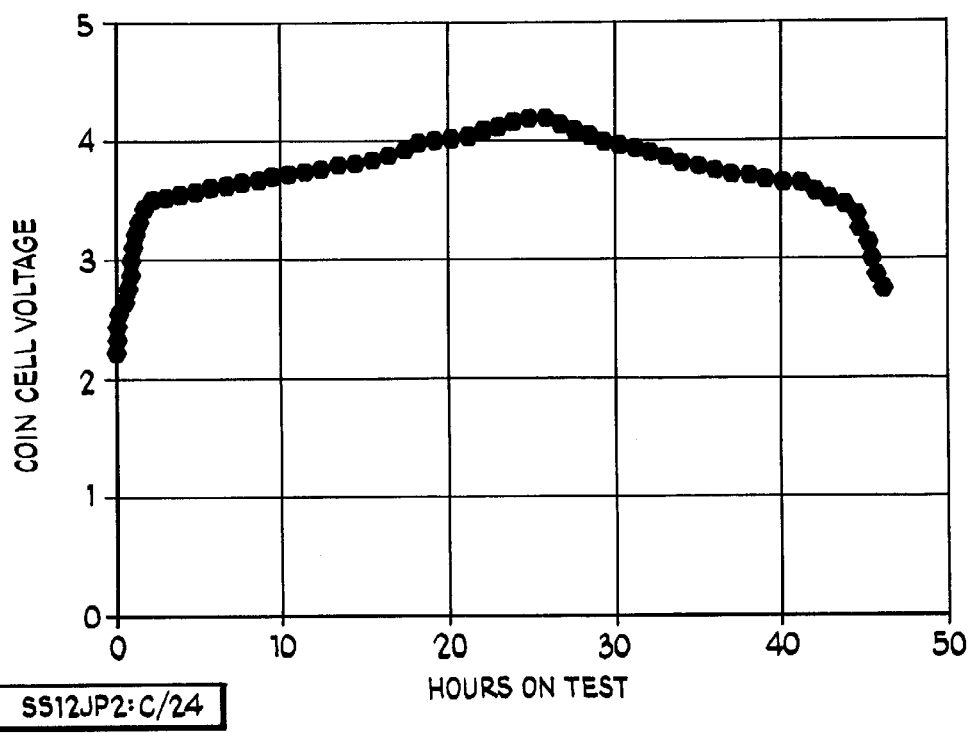
FIG. 4 of the drawings is a plot of cell voltage versus time for a cell fabricated in accordance with the present invention.

FIG. 4 shows the first charge/discharge cycle of a $LiNiO_2$ niobate FGM electrode coin cell tested at about C/24. The profile is consistent with a $LiNiO_2$ cathode.

Figure 5:
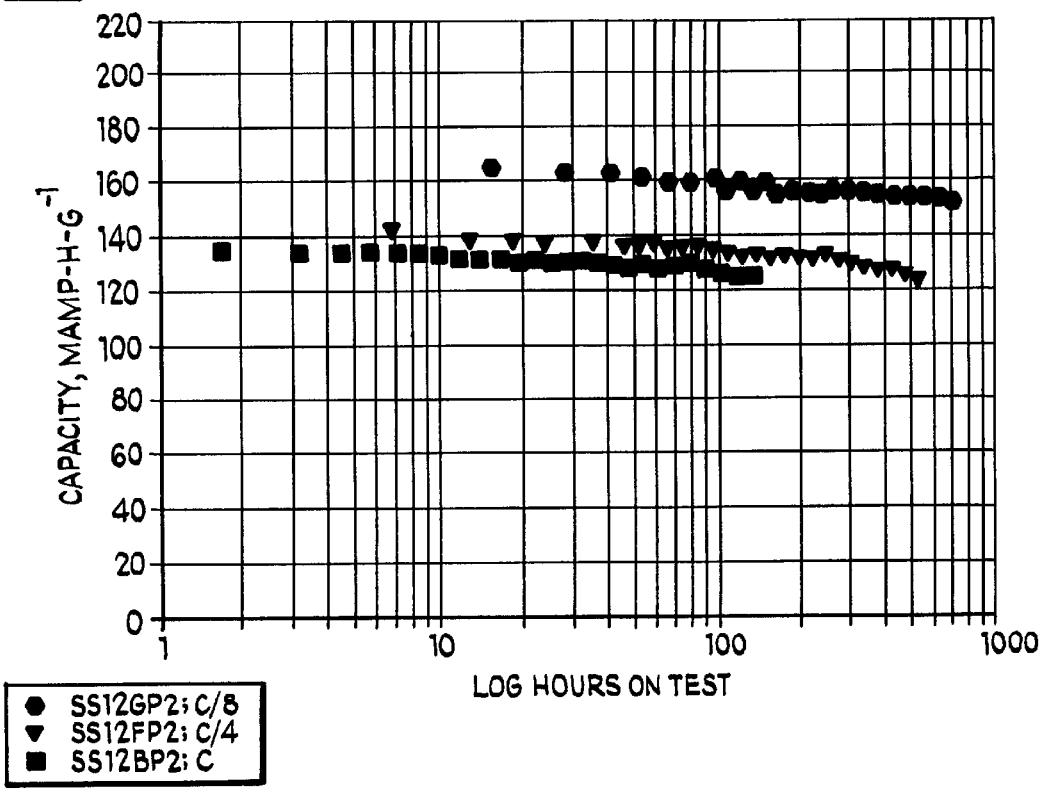
FIG. 5 of the drawings is a plot of cell capacity versus time at different cycle rates for a cell fabricated in accordance with the present invention.

FIG. 5 shows the effect of cycle rate on the $LiNiO_2$ niobate FGM electrode coin cells at C, C/4, and C/8 rates. Note that there is very little loss of cell capacity even after 700 hours of testing.

Figure 6:
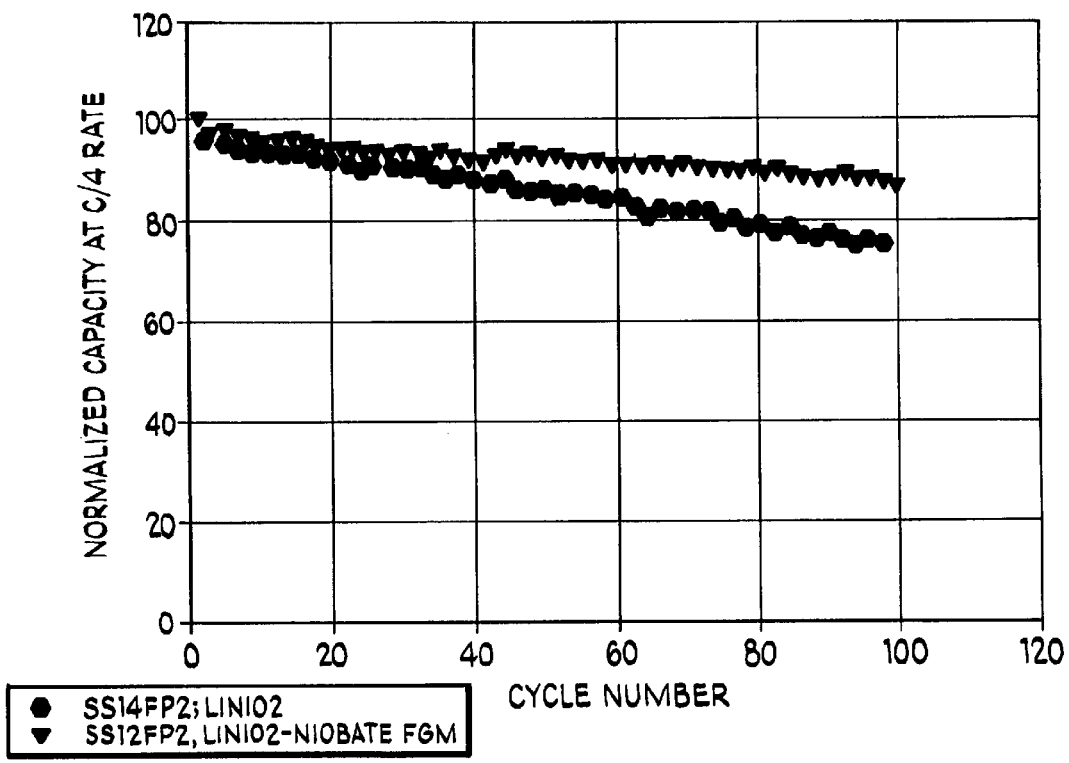
FIG. 6 of the drawings is a plot of normalized capacity versus cycle number for both a test cell as well as a cell fabricated in accordance with the present invention.

FIG. 6 shows a comparison of capacity versus cycles number for a $LiNiO_2$ niobate FGM electrode coin cell and a $LiNiO_2$ electrode coin cell tested at about the C/4 rate. As can be seen, the cell with the $LiNiO_2$ niobate FGM electrode has retained its capacity much better than the cell with the $LiNiO_2$ electrode. This indicates that secondary, irreversible reactions on the electrode surface of the $LiNiO_2$ niobate FGM electrode are occurring at a significantly lower rate than in the cell with the $LiNiO_2$ electrode. Therefore, the $LiNiO_2$ niobate FGM electrode has demonstrated, among other things, a substantially improved electrolyte compatibility relative to a $LiNiO_2$ electrode.

Figure 7:
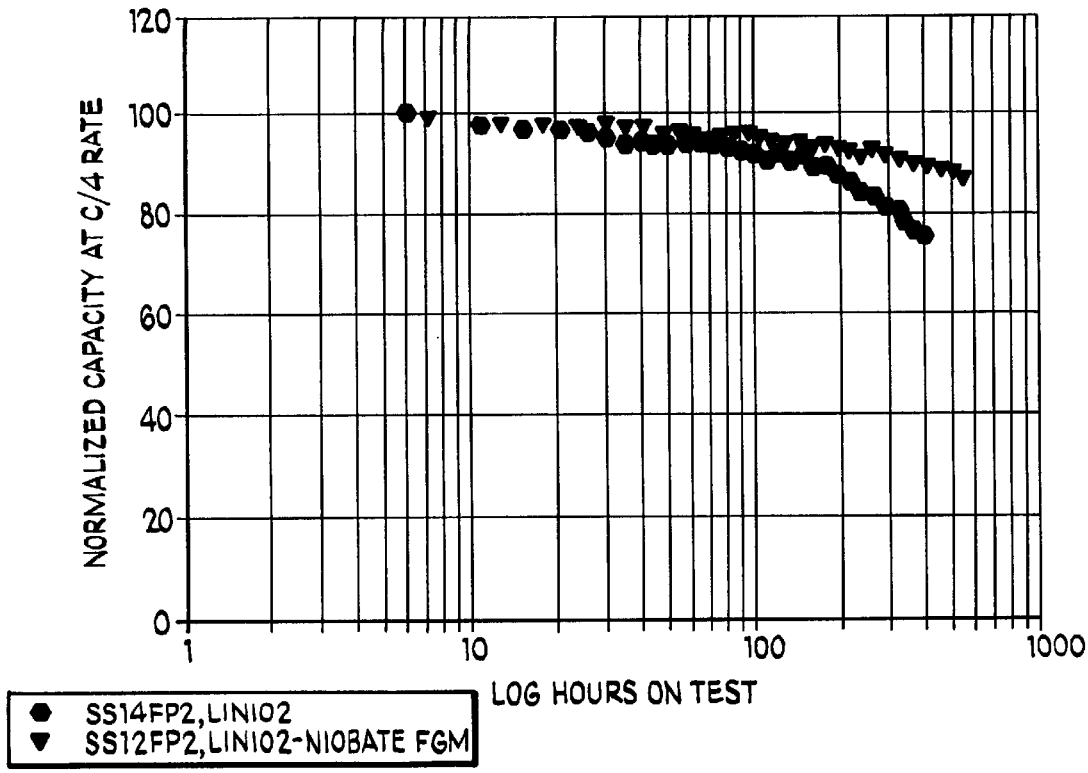
FIG. 7 of the drawings is a plot of normalized capacity versus cycle time for both a test cell as well as a cell fabricated in accordance with the present invention.

FIG. 7 shows the cumulative effect of normalized capacity as a function of cycle time for a $LiNiO_2$ electrode as well as for a $LiNiO_2$ niobate FGM electrode.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. An electrode for use in an electrochemical cell comprising:
   a current collecting substrate;
   an active material associated with the substrate; and
   a surface modifying component applied to at least a portion of the active material, wherein the surface modifying component is selected from the group consisting of lithium niobates, lithium tantalates, and mixtures thereof, and wherein the surface modifying component is doped with a dopant selected from the group consisting of carbonaceous particles, transition metal oxides, metal oxides, non-metal oxides, rare earth metal oxides, metal phosphates, metal sulfates, metal sulfides, and mixtures thereof.

2. The electrode according to claim 1, further comprising means for maintaining 80% of normalized capacity of the electrode after 100 cycles.

3. The electrode according to claim 2, wherein the capacity maintaining means comprises the surface modifying component.

4. The electrode according to claim 1, wherein the surface modifying component is fabricated from at least one lithium niobate species having the chemical structure $Li_xNbO_y$, wherein x and y range from about 1 to 5.

5. The electrode according to claim 1, wherein the surface modifying component is fabricated from at lest one lithium tantalate species having the chemical structure $Li_xTaO_y$, wherein x and y range from about 1 to 5.

6. The electrode according to claim 1, wherein the surface modifying component is in a crystalline or glassy state.

7. An electrochemical cell comprising:
   an electrolyte;
   a first electrode and a second electrode wherein at least one of the first and second electrodes comprises:
      a current collecting substrate;
      an active material associated with the substrate; and
      a surface modifying component applied to at least a portion of the active material, wherein the surface modifying component is selected from the group consisting of lithium niobates, lithium tantalates, and mixtures thereof, and wherein the surface modifying component is doped with a dopant selected from the group consisting of carbonaceous particles, transition metal oxides, metal oxides, non-metal oxides, rare earth metal oxides, metal phosphates, metal sulfates, metal sulfides, and mixtures thereof.

8. The electrochemical cell according to claim 7, further comprising means for maintaining 80% of normalized capacity of the electrode after 100 cycles.

9. The electrochemical cell according to claim 8, wherein the capacity maintaining means comprises the surface modifying component.

10. The electrochemical cell according to claim 7, wherein the surface modifying component is fabricated from at least one lithium niobate species having the chemical structure $Li_xNbO_y$, wherein x and y range from about 1 to 5.

11. The electrochemical cell according to claim 7, wherein the surface modifying component is fabricated from at lest one lithium tantalate species having the chemical structure $Li_xTaO_y$, wherein x and y range from about 1 to 5.

12. The electrochemical cell according to claim 7, wherein the surface modifying component is in a crystalline or glassy state.

13. A process for manufacturing an electrochemical cell comprising the steps of:

associating a surface modifying component with an active material, wherein the surface modifying component is selected from the group consisting of lithium niobates, lithium tantalates, and mixtures thereof, and wherein the surface modifying component is doped with a dopant selected from the group consisting of carbonaceous particles, transition metal oxides, metal oxides, non-metal oxides, rare earth metal oxides, metal phosphates, metal sulfates, metal sulfides, and mixtures thereof;

fabricating a first electrode by applying the active material associated with the surface modifying component to a current collecting substrate;

fabricating a second electrode; and associating at least one electrolyte with the first and second electrodes.

* * * * *